L. S. HACKNEY.
STEERING DEVICE FOR TRACTION VEHICLES.
APPLICATION FILED SEPT. 28, 1911.
1,031,064.
Patented July 2, 1912.
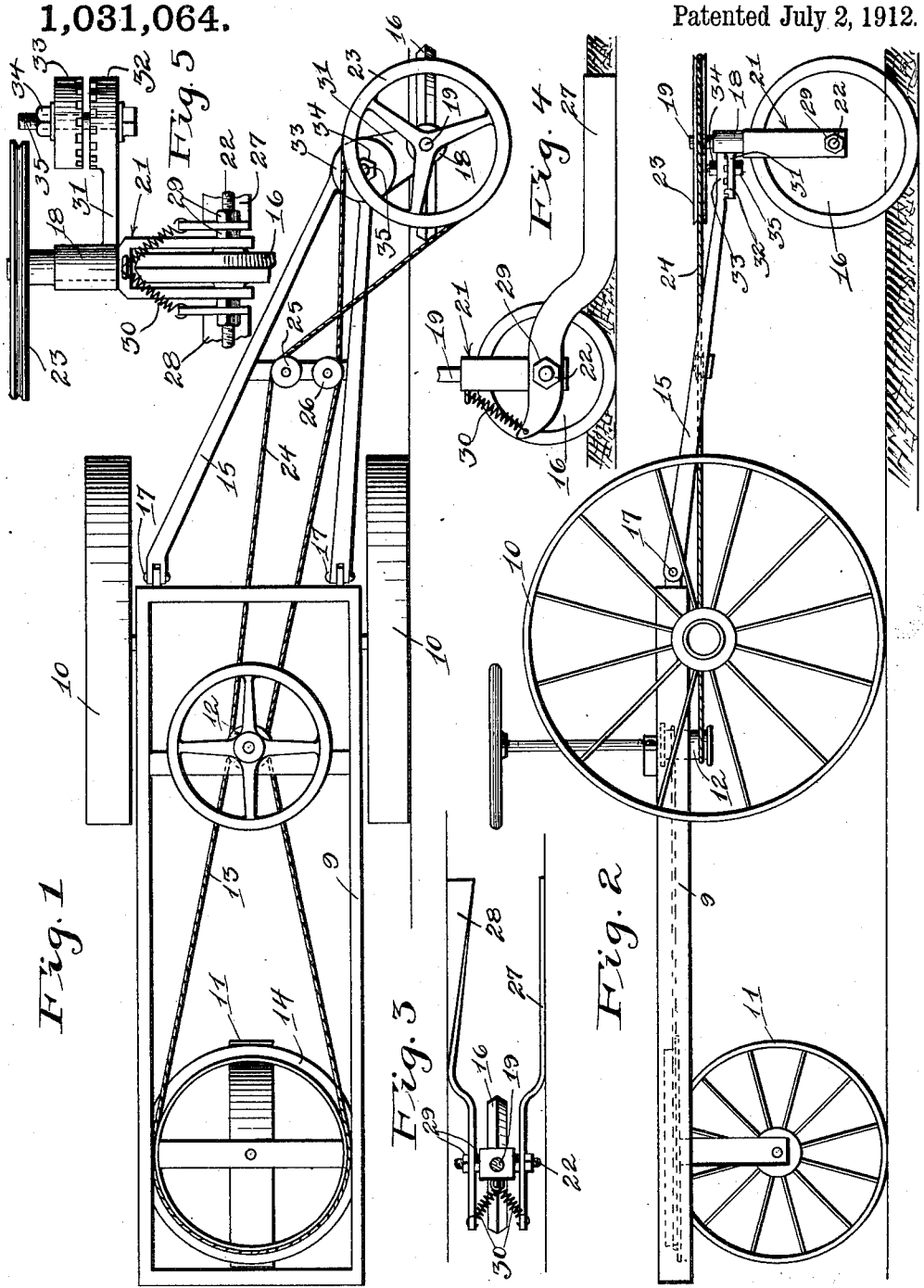
Witnesses
F. C. Caswell
W. H. Williams
Inventor
Leslie S. Hackney
by John E. Stryker Atty.

UNITED STATES PATENT OFFICE.

LESLIE S. HACKNEY, OF ST. PAUL, MINNESOTA.

STEERING DEVICE FOR TRACTION-VEHICLES.

1,031,064. Specification of Letters Patent. Patented July 2, 1912.

Application filed September 28, 1911. Serial No. 651,816.

*To all whom it may concern:*

Be it known that I, LESLIE S. HACKNEY, a citizen of the United States, residing at St. Paul, in the county of Ramsey and State of Minnesota, have invented new and useful Improvements in Steering Devices for Traction-Vehicles, of which the following is a specification.

My invention relates to improvements in steering devices for traction vehicles. Its object is to provide a novel and efficient steering device of the pilot wheel type, particularly for use in connection with traction vehicles having a rear guiding member.

A further object is to provide a durable device of this class having its pilot wheel coordinated with the steering mechanism of a traction vehicle and adapted to operate in conjunction therewith as an auxiliary guiding member.

In the drawings, Figure 1 is a plan view showing my improved steering device in connection with a traction vehicle of the type having a rear guiding wheel; Fig. 2 is a side elevation of the same; Fig. 3 is a plan view in detail showing the pilot wheel with guiding wings attached thereto; Fig. 4 is a side elevation of the same, and Fig. 5 is a front elevation in detail showing the forward end of the pilot frame.

The vehicle proper may comprise the tractor frame 9 supported by the traction wheels 10 and a rear steering wheel 11, said steering wheel being operated by the steering post 12 through the cable 13 and steering drum 14.

My improvement comprises a frame 15 pivotally attached to the front end of the tractor frame, a pilot wheel 16 adapted to travel in a previously formed furrow and connecting means between the pilot wheel and steering drum of the tractor adapted to synchronize the movements of the pilot wheel and rear steering wheel. The pilot frame 15 is connected with the tractor frame 9 by means of horizontal pins 17 adapted to permit oscillation of the pilot frame in a vertical plane but prevent horizontal movement between the two frames. The upright bearing 18 is supported at the forward end of the frame 15 and in this bearing is journaled the shaft 19 which is bifurcated at its lower end. In this bifurcation 21 the pilot wheel 16 is journaled by means of the pintle 22. At the upper end of the shaft 19 is fixed the horizontal pulley 23 to which the endless cable 24 is attached. This cable is crossed, then passes over the sheaves 25 and 26 and extends to and around the steering post 12 thus transmitting side movement of the pilot wheel 16 to the steering drum of the tractor and also communicates the rotation of the steering drum to the pulley 23 and through it to the pilot wheel.

I have provided the yielding wings 27 and 28 designed to be used in conjunction with the pilot wheel 16 and adapted to aid said pilot wheel in following the furrow. The ends of the pintle 22 are threaded and extend outwardly from the bifurcation 21. The wings 27 and 28 are pivoted on said pintle 22 at opposite sides of the bifurcation 21 and are mounted between the nuts 29, which are adjusted to secure the proper tension of said wings against the sides of a furrow, also to vary the distance between said wings, thus adapting the same for use in furrows of different widths. The wing 27 is formed to present a broad bearing surface to the land side of the furrow and the wing 28 is twisted to present an edge to the opposite side to prevent said wing from climbing when pressure is applied thereto. The springs 30 are arranged at the forward ends of the wings 27 and 28 to yieldingly hold said wings against the bottom of a furrow.

I provide the following mechanism whereby the pilot wheel may be shifted horizontally to alter its position relative to the frame of the traction vehicle. The subframe 31 forms a mounting for the bearing 18 and is provided with a disk 32 having radial teeth on its upper face. To the end of the pilot frame is attached a disk 33 having radial teeth on its lower face. The teeth of the disks mesh and form a rigid connection between said pilot frame and sub-frame when the disks are clamped together by the manipulation of the nut 34 on the bolt 35. The relative adjustment of these disks may be altered to secure different positions of the pilot wheel.

As the primary purpose of my invention is to maintain parallelism between furrows, a straight furrow should first be plowed and the pilot wheel placed therein, with the tractor parallel with and at a predetermined distance therefrom. When the pilot wheel is thus placed in the furrow it follows the furrow as the tractor advances. The wings 27 and 28 when properly adjusted, facilitate the action of the pilot wheel in following the furrow. Any movement of the pilot wheel out of a right line caused by a change in the direction of the furrows is transmitted through the crossed chains to reverse the guiding wheel of the tractor for properly changing the direction of the same. On turning at the end of the furrow said pilot wheel and tractor guiding wheel are properly directed by the ordinary tractor steering mechanism, and the same hand control is always possible in case of unusual obstructions to the pilot wheel.

Having described my invention, what I claim as new and desire to protect by Letters Patent, is:

1. The combination with a traction vehicle having a rear steering wheel and front supporting wheels of a pilot frame tiltably mounted on the frame of said traction vehicle, a pilot wheel on said pilot frame arranged to travel in a previously formed furrow and connecting means between the pilot wheel and steering wheel for synchronizing the movement of said wheels.

2. An attachment for tractors having a rear steering wheel, comprising a frame pivotally mounted on the front end of the tractor frame, a pilot wheel journaled in said pivoted frame, a drum rigidly connected with said steering wheel, a horizontal pulley rigidly connected with the pilot wheel and a crossed endless cable adapted to transmit motion between said drum and pulley.

3. The combination with a traction vehicle having a rear steering wheel and front supporting wheels of a pilot frame tiltably mounted on the frame of said traction vehicle, a sub-frame on said pilot frame capable of horizontal adjustment with respect thereto, a pilot wheel on said sub-frame arranged to travel in a previously formed furrow and a crossed cable adapted to transmit and reverse motion between said steering wheel and pilot wheel.

4. The combination with a traction vehicle having a rear steering wheel and steering mechanism for said wheel of a pilot frame tiltably mounted on the front end of said vehicle, a sub-frame on said pilot frame pivotally connected thereto and capable of horizontal movement, a pilot wheel on said frame arranged to travel in a previously formed furrow and means for synchronizing and reversing movement between said pilot wheel and steering mechanism.

5. The combination with a traction vehicle having a rear steering wheel and front supporting wheels of a pilot frame pivotally mounted on the front end of said vehicle, a sub-frame mounted upon said pilot frame, pivotally connected thereto and capable of horizontal movement, means for clamping said frames together, a pilot wheel journaled in said sub-frame and arranged to travel in a previously formed furrow and connecting means between the pilot wheel and steering wheel for synchronizing the movement of said wheel.

6. The combination with a traction vehicle and the steering mechanism therefor, of a pilot frame on said vehicle, a pilot wheel adapted to travel in a previously formed furrow, a mounting for said wheel journaled in said frame, means connecting the pilot wheel and the steering mechanism for synchronizing the movement thereof, and wings on said mounting for properly directing the pilot wheel in the furrow.

7. The combination with a traction vehicle and the steering mechanism therefor, of a pilot frame on said vehicle, a pilot wheel adapted to travel in a previously formed furrow, a mounting for said wheel journaled in said frame, means connecting the pilot wheel and the steering mechanism, wings on said mounting for properly directing the pilot wheel in the furrow, and means for spacing said wings.

8. The combination with a traction vehicle and the steering mechanism therefor, of a pilot frame on said vehicle, a pilot wheel adapted to travel in a previously formed furrow, a mounting for said wheel journaled in said frame, means connecting the pilot wheel and the steering mechanism for synchronizing the movement there-between, wings pivotally arranged on said mounting for properly directing the pilot wheel in the furrow, and means for yieldingly holding said wings against the bottom of the furrow.

In testimony whereof, I have signed my name to this specification in the presence of two subscribing witnesses.

LESLIE S. HACKNEY.

Witnesses:
ASHLEY COFFMAN,
LOUIS JOHNSON.

Copies of this patent may be obtained for five cents each, by addressing the "Commissioner of Patents, Washington, D. C."